(12) United States Patent
Lee

(10) Patent No.: US 7,431,854 B2
(45) Date of Patent: Oct. 7, 2008

(54) METHOD FOR DIRECTLY FORMING A CUTTER MOLD WITH DOUBLE ETCHING AND APPARATUS THEREOF

(76) Inventor: Chia Shun Lee, No.361-1, Dong Yong Street, Bade (TW) 334

( * ) Notice: Subject to any disclaimer, the term of this patent is extended or adjusted under 35 U.S.C. 154(b) by 158 days.

(21) Appl. No.: 11/049,174

(22) Filed: Mar. 30, 2005

(65) Prior Publication Data

US 2006/0060567 A1 Mar. 23, 2006

(30) Foreign Application Priority Data

Sep. 23, 2004 (TW) ............... 93128790 A

(51) Int. Cl.
B44C 1/22 (2006.01)
C25F 3/00 (2006.01)
(52) U.S. Cl. .................................... 216/11
(58) Field of Classification Search ............ 216/52; 76/107.1
See application file for complete search history.

(56) References Cited

U.S. PATENT DOCUMENTS

2004/0020328 A1 2/2004 Wang ................ 76/107.1

2005/0050936 A1 * 3/2005 Hughes et al. ............... 72/344

FOREIGN PATENT DOCUMENTS

| CN | 1710145 | 12/2005 |
| GB | 2418398 | 6/2007 |
| JP | 9302481 | 11/1997 |

* cited by examiner

Primary Examiner—Roberts Culbert
(74) Attorney, Agent, or Firm—I-van Su

(57) ABSTRACT

A method for directly forming a cutter mold with double etching and an apparatus thereof includes the following steps: a metal plate for being made, the cutter mold is tightly pressed with a light-resisting agent membrane first, an image of cutter mold drawing, which provides lines with widths thereof being one fifth or one tenth of the lines on the ink drawing of conventional cutter mold, is transferred to the light-resisting agent membrane. The thinner lines perform obstructing the etching liquid, which sprays toward the membrane to etch the work. Finally, the unnecessary membrane is peeled and two lateral sides of the formed cutter mold are etched with light etching liquid to complete the cutter mold with a sharp blade.

3 Claims, 3 Drawing Sheets

METHOD FOR DIRECTLY FORMING A CUTTER MOLD WITH DOUBLE ETCHING AND APPARATUS THEREOF

FIELD OF THE INVENTION

The present invention relates to a method and an apparatus for making a cutter mold, more particularly, to a method and apparatus for making a thin stamping mold (or cutter mold) for cutting or forming thin sheets of papers, plastics, sponges, paperboards, corrugated papers, floppy disks, picture papers, cloths, lathers, irons, cork stoppers, cards, photo albums, packing boxes, teaching materials for preschool children, fine arts, home economics, puzzles, advertisements, posters, shop windows, stage design and so on.

BACKGROUND OF THE INVENTION

Conventional cutter molds can be divided into two categories; one such as plastic laser cutter mold, line cut cutter mold or plastic cutter mold is formed by way of a wooden, plastic or steel plates being planted with blades and called as traditional cutter mold and the other one is called etched cutter mold, which is made by way of a metal plate being etched to form a cutter body and the blade being formed with CNC milling machine or grinding machine.

Although the traditional cutter mold provides blades with consistent quality and wider blades being chosen in case of cutting thicker material with longer life span, the bent angle for each of the blades is limited so that the fabrication cost and accuracy of distances and angles between the cutting lines are limited too.

Contrarily, the etched cutter is advantageous in fabrication cost and configuration change and it is a good associated part in a rolling type continuous mold in spite of thicker material being unable to be cut with the etched cutter.

The etched cutter mold is made by way of a popularly used etching technique. Referring to FIG. 3, a metal plate is printed on the surface thereof with an ink layer 30 and the surface provides an ink layer zone and a blank zone. The metal plate is soaked in etching liquid after the ink layer has dried and the blank zone is etched with the etching liquid. Then, the ink is removed from the blade parts 471, 472 of the front end of the cutter mold and are grinded with a grinder, a milling machine or a lathe to allow the cutter body 43 providing a shape of an approximate equilateral triangle and being upright from a base 40 with a sharp point 46 constituted by the metal plate.

The ink print of the conventional etching for making cutter mold has a physical limitation. Too thick of ink provides less fluidity and inconsistent viscosity and a problem frequently met is that both sides of the contour have wavy and zigzag shapes and, even more, disconnected lines are created to degrade the effect of etching. Too thin of ink provides insufficient obstruction and it is incapable of forming the cutter body. Hence, it is very hard for the conventional etching way to create delicate and homogenous ink lines. The only way that can be done with the conventional method is that thick contour ink lines are printed for making a cutter mold blank and a computer program adapted to a grinding machine is designed to comply with a specific shape of the desired shape of the cutter mold. Hence, the grinding machine performs to work the cutter mold blank and remove two extremely wide lateral blade parts 471, 472 for forming the blade of the cutter mold.

As the foregoing, all the conventional etching molds have to be completed with the process of grinding and cutting and distance B between cutter body edge lines is often limited by size of the grinding tool head and it results in the configuration of the cutter mold and thickness of the contour lines of the cutter mold are subjected to many restrictions. Especially, how to deal with the problems related to equipment and technique is a difficult subject and that is why the fabrication cost is kept high. These are reasons of the conventional method for making the cutter mold incapable of being popularly utilized.

In addition, the cutter mold has been becoming a required tool gradually for a technical work piece made at home or personal working room with fast speed, accuracy and desired configuration. For instance, a suitable cutter mold is needed while cards, dolls, posters or advertisement are made. If each cutter mold has to be grinded with a grinding machine and the grinding machine only can reach certain ranges of sizes. Further, in order to maintain the grinding machine in good condition, it is necessary to perform maintenance periodically. However, the conventional technique for making the cutter mold is obviously unable to meet the needs of the current market.

SUMMARY OF THE INVENTION

The crux of the present invention is to solve the problem working the blank cutter mold and reduce the distance between blade lines so as to stamp smaller sized product, enhance production efficiency and lower production cost.

The first feature of the present invention is in that a light-resisting membrane is pressingly attached to the surface of a metal plate for making the cutter mold. The light-resisting agent membrane becomes a protective membrane tightly adhering to the surface of etched plate after the exposing process. The property of the light-resisting agent membrane makes the developed contour lines consistent in thickness and width such that line width on the drawing of the cutter mold is one fifth or one tenth of the line width on the ink printed drawing of the conventional cutter mold with no disconnecting lines or inconsistent line thickness. That is, the line itself is close to the precision of the blade and this is the technique not possible to reach by the ink print.

The second feature of the present invention is in that the etching liquid is pressurized and atomized before being sprayed on moving work pieces evenly. In this way, the etching liquid can be used as less as possible and etching effect can be enhanced extremely. Further, the etching liquid can be recycled easily.

The conventional etching method for making the cutter mold is to immerge the work piece in the etching liquid. Because the equipment is simple, the quality cannot be controlled easily due to the liquid pressure and consistency of the recycled etching liquid being incapable of controlled precisely. In order to secure the work, the width of the contour line of the cutter mold is enlarged and then trued with grinding operation. Hence, the primary work for the conventional etched cutter mold is extremely rough.

The metal plate of the present invention is adhered with a light-resisting agent membrane at the front side thereof and the membrane is cut as an optical mask to form a protective layer after exposing and developing with an edge acting as an etching proof membrane line, which is more smooth and neater than that done by the ink print. The etching method of the present invention, which is different from the conventional way being immerged in the etching liquid, provides pressurized etching liquid in a state of approximate atomization before the etched surface being sprayed with the etching liquid. The etching liquid sprays downward on top of the etched surface and the etching time duration and pressure of the etching liquid are set depending on the required height of the cutter body. Hence, a position difference between the etched part and the protective layer part can be formed gradually in the process of etching. The etching liquid, which creats a chemical reaction with the metal plate, is collected by a collection pan under the bottom of the etched plate for further use again.

Once the cutter body is formed, the optical mask protective membrane along the cutting line is removed and the cutting line of the cutter body has a sharp line, which is long, flat, equally wide and edge-smooth. The cutter body has a trapezoidal shape with a narrow top and a little wide bottom and is upright from the base of the etching surface of the metal plate. Finally, a delicate etching is performed to spray the atomized etching liquid with lighter pressure and a faster speed to the top of the cutter body, on which the optical mask membrane has been removed, such that both lateral sharp lines at the top of the cutter body are etched to form a curved shape, which is approximate acute angle, to allow the top of the cutter body becoming small and sharper circular tool point for reinforcing exertion force of the cutter point.

The etched metal solution flows downward from top to pass over the both sides of the cutter body and part of the etched metal solution deposits at the corners between the cutter body and the base and the base itself to constitute an auxiliary base for the cutter body and the base. In this way, the cutter body can be joined to the base tightly and the cutter mold is completed after surface finishing and anti-rust treatment.

Accordingly, a primary object of the present invention is to provide a method for directly forming a cutter mold with double etching and an apparatus thereof with which the problem concerning utilizing the grinding machine, CNC milling machine or CNC lathe created in the process of final finishing done by the conventional etched cutter mold can be overcome.

Another object of the present invention is to provide a method for directly forming a cutter mold with double etching and an apparatus thereof with which the problem resulting from the easily damaged blades of the cutter mold can be solved completely.

A further object of the present invention is to provide a method for directly forming a cutter mold with double etching and an apparatus thereof with which the environment pollution and public nuisance can be decreased tremendously.

A further object of the present invention is to provide a method for directly forming a cutter mold with double etching and an apparatus thereof with which the step of finishing the cutter mold can be waived so that not only the quality of the cutter mold is enhanced but also the mass production for the cutter mold becomes possible for increasing productivity and decreasing production cost.

BRIEF DESCRIPTION OF THE DRAWINGS

The above objects and advantages of the present invention will become more apparent with reference to the appended drawings wherein.

DETAILED DESCRIPTION OF THE INVENTION

Figure 1:
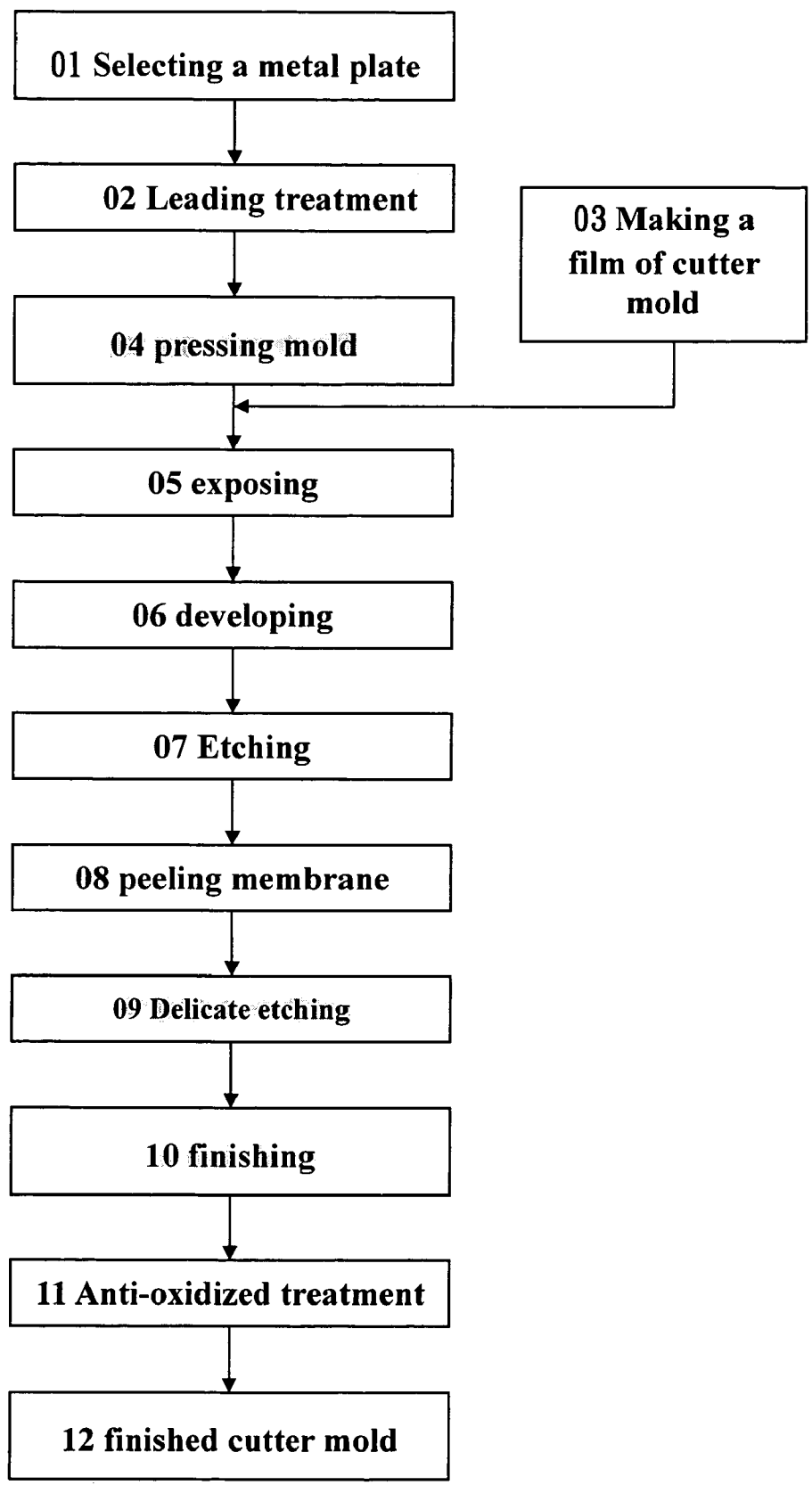
FIG. 1 is a flow chart of a method for directly forming a knife mold with double etching according to the present invention.

Referring to FIG. 1, a method for directly forming a cutter mold with double etching according to the present invention comprises the following steps.

1. Select a metal plate suitable for being made as a cutter mold and the metal plate is adhered with a light-resisting agent membrane to retain optical mask lines after image being transferred, exposed and developed.

2. The optical mask surface is etched with approximately atomized etching liquid first after the etching liquid is regulated to provide a suitable spray pressure and spray angle.

3. The optical mask membrane of the metal plate is stripped rapidly with water spray and waste substances are separated from wastewater with a screen cylinder and both the waste stuff and the wastewater are collected with a recycling unit respectively.

4. Upper two lateral sides of the blade of formed cutter are sprayed with a little amount atomized etching liquid to remove sharp lines thereof.

5. A movable brush cylinder is actuated with magnetic force to move on the etching surface of the formed cutter in a rush with high speed so as to perform operations of rubbing, grinding and finishing.

The preceding steps are explained in detail hereinafter with a heat-treated high carbon steel plate as an example.

1. First of all, the steel plate is cut in a proper size with leading treatments such as degreasing and cleaning. Then, a membrane of the light-resisting agent is pressingly adhered to the front side of the worked steel plate with a membrane press machine such that the light-resisting agent membrane can occur chemical reaction to prevent from being etched after a contour drawing of the cutter mold has been transferred to the light-resisting agent membrane and exposed and developed. That is, the light-resisting agent membrane provides effects of separation and protection. The backside of the steel plate is attached with an acid resisting membrane to prevent from being etched.

Figure 2:
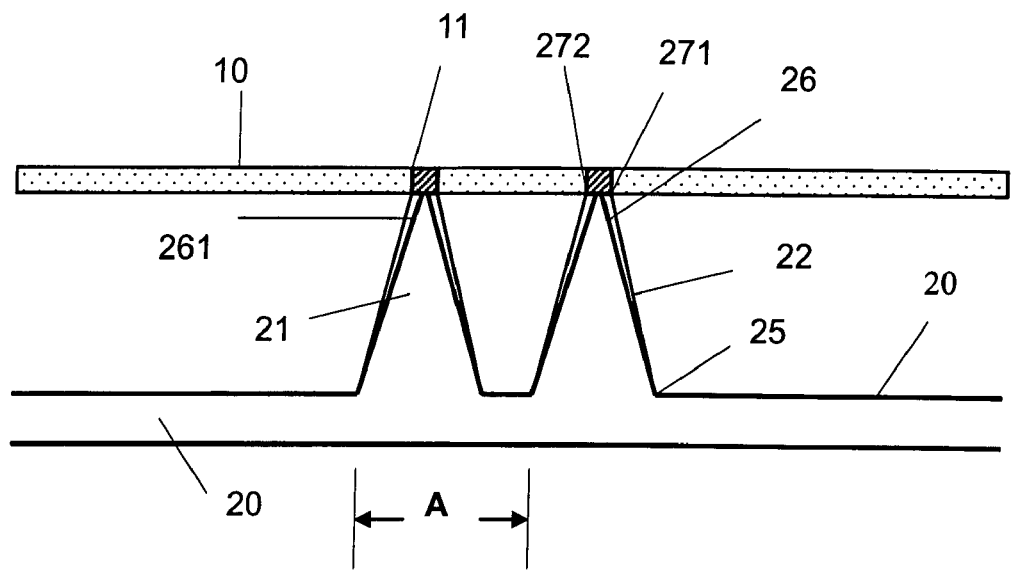
FIG. 2 is a sectional view of a cutter mold made with the method of the present invention.

It can be seen in FIG. 2 that a steel plate 20 has a light resisting agent membrane 10 pressingly attached to the front side thereof and the part, which provides the function of obstructing being etched after exposing and developing, is indicated with reference number 11. The width of the line is one fifth to one tenth of printing ink lines of the conventional cutter mold.

Further, once the cutter body 21 is formed, the optical mask protective membrane 11 at the cutting line is removed and the cutting line of the cutter body 21 has a sharp line, which is long, flat, equally wide and edge-smooth. The cutter body 21 has a trapezoidal shape with a narrow top and a little wide bottom and is upright from the base 20 of the etching surface of the metal plate. Finally, a delicate etching is performed to spray the atomized etching liquid with lighter pressure in a fast speed to the top of the cutter body 21, on which the optical mask membrane 11 has been removed, such that both lateral sharp lines 271, 272 at the top of the cutter body 21 are etched to form a curved shape, which is an approximate acute angle, to allow the top of the cutter body 21 becoming small and sharper circular tool point for reinforcing exertion force of the blade 26.

2. The steel plate 20 with the developed image is moved into an etching room and the etched surface thereof is sprayed with atomized etching liquid, which provides a proper spray pressure and spray angle from two upper lateral sides of the etched surface. The surface covered by the light resisting agent membrane 10 and the part under the surface are completely protected from being etched such that two lateral sides of the cutter form a wall surface with narrow top and wide bottom naturally. Further, the etched surface is evenly worked by way of relative swinging and the base 20 can maintain at the same level.

It can be seen in FIG. 2 again that once the cutter body 21 is formed, the optical mask protective membrane 11 at the cutting line is removed and the cutting line of the cutter body 21 has a sharp line, which is long, flat, equally wide and edge-smooth. The cutter body 21 has a trapezoidal shape with a narrow top and a little wide bottom and is upright from the base 20 of the etching surface of the metal plate. Finally, a delicate etching is performed to spray the atomized etching liquid with lighter pressure in a fast speed to the top of the cutter body 21, on which the optical mask membrane 11 has been removed, such that both lateral sharp lines 271, 272 at the top of the cutter body 21 are etched to form a curved shape, which is approximate acute angle, to allow the top of the original cutter body 22 becoming small and sharper circular tool point for reinforcing exertion force of the blade 26. Hence, it can be seen in FIG. 2 that the blade point 261 is very sharp after being worked with the method and the device of the present invention. The final cutter body 21 is much smaller in size and the distance A between two adjacent cutter bodies 21 is much shorter.

3. A recycle tank is disposed under the net shaped worktable to collect the wastewater falling down through the worktable during etching such that the etching liquid can be used again to reach purposes of environment protection and cost reduction.

4. The membranes at both sides of the steel plate 20 are peered off rapidly by way of upper and lower nozzles of a membrane peering and filtering device. The waste substances are separated from the wastewater by means of the screen cylinder and both the waste stuff and the wastewater are collected at the recycle unit.

5. The two lateral sides of the cutter mold are further sprayed with atomized etching liquid in less pressure to allow little juts such as sharp lines at two upper lateral sides of the cutter being etched again so as to provide an arctic shape. Hence, mixture containing a little amount etching liquid and small metal particles deposits at the lateral sides of the cutter and the base 20 to form a reinforced base.

6. Finally, the movable metal brush, which rushes rapidly, brushes and finishes the surface of the steel plate and oxidation preventive is used for clearing the finished surface to complete fabrication of the cutter mold.

The outstanding advantages of the method for directly forming a cutter mold with double etching according to the present invention are short fabricating hours, low fabricating cost, different cutter body heights being able to be made depending on different cut metal plates and the wastewater being able to be recycled. The cutter mold made with the method of the present invention provides good points such as being able to be made in mass production easily, having steady quality, high security, low price and long life span so that it is quite suitable for being utilized in a personal work room, family and middle or small business to make personalized works. Especially, when the cutting side of the cutter mode is stuck with a layer of protective foam material, an effect of facilitating mold releasing.

The apparatus implementing the method of the present invention includes an image transfer device, an etching recycle device, a peeling and filtering device and a double etching device. The image transfer device prints the image of a film on the etching membrane and the optical mask thereon provided at the metal plate. The etching recycle device collects atomized etching liquid, which used for etching the preceding membrane. The peeling and filtering device provides a low speed motor to actuate membrane peeling with water and separate discarded substances from the wastewater. The double etching device provides sophisticated sharp etching blades to perform forming the cutter mold.

The greatest effect of the apparatus according to the present invention is in that the cutter body forms a very tiny and sharp blade 26 as shown in FIG. 2 on the cutter mold for facilitating cutting.

Figure 3:
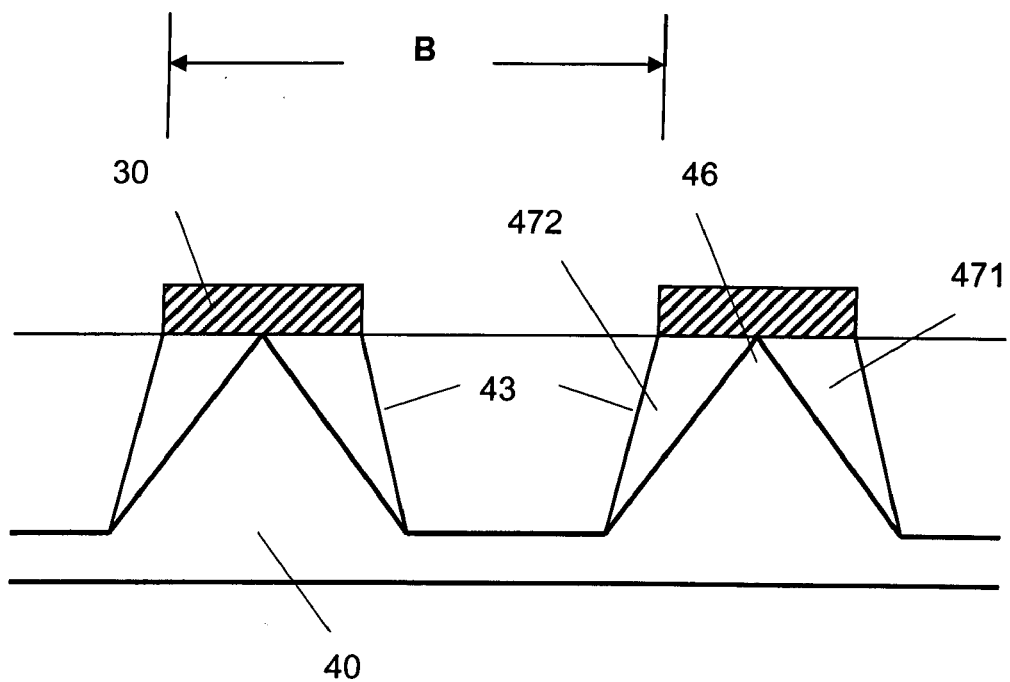
FIG. 3 is a sectional view of a cutter mold made with the conventional method.

Comparing FIG. 2 to FIG. 3, it can be seen that the cutter mold made with the method of the present invention has thinner etching obstruction membrane 11 and thinner lines, but, the conventional cutter mold made with the conventional method has an ink layer 30 with inconsistent thickness and lines. Further, proportion of the line width of the obstruction membrane 11 to the ink layer 30 is 1:10 approximately. These are biggest differences between the cutter mold of the present invention and the conventional cutter mold. Due to different top areas, the cutter body 21 of the present invention provides a cross section different from the cutter body 43 of the conventional art in spite of having the same etching angle.

Figure 4:
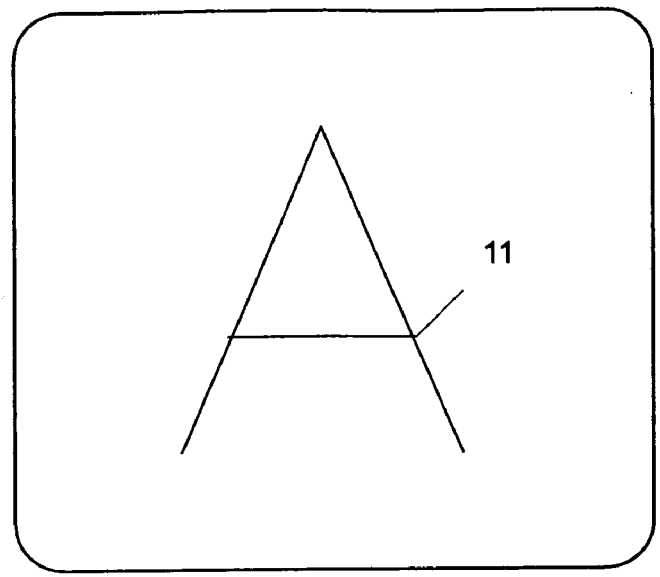
FIG. 4 is a plan view of a cutter mold made with the method of the present invention.
Figure 5:
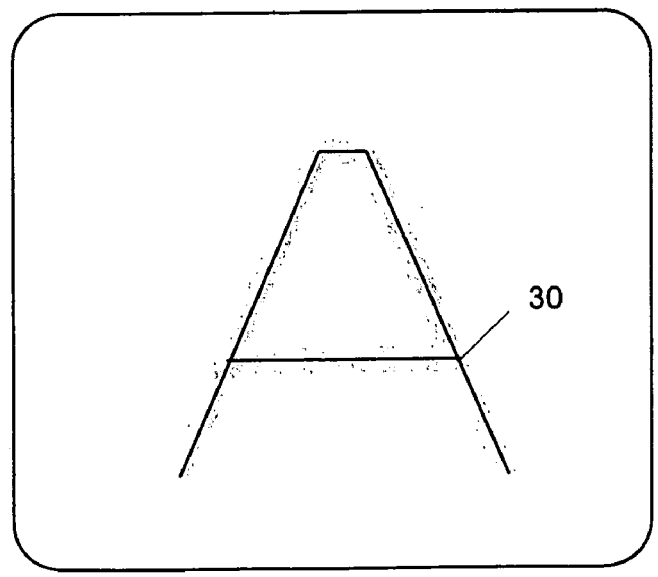
FIG. 5 is a plan view of a cutter mold made with the conventional method.

Referring to FIGS. 4 and 5, the cutter mold of the present invention provides line width of membrane 11 only about one fifth to one tenth of the line width of ink layer 30 of the conventional cutter mold due to the light-resisting membrane evenly pressing to the surface of the metal plate as shown in FIG. 4. However, line width of the conventional cutter mold includes gray area shown in FIG. 5 and these areas have to be removed with a grinder carefully.

Summarized the preceding description, the method for directly forming a cutter mold with double etching and the apparatus thereof according to the present invention provides following innovative features:

1. A cutter mold blank closed to the finished cutter mold can be obtained, that is, an effective light-resisting agent membrane 11 covers the base material and a neat etching proof line can be maintained.

It is known that the conventional way for etching proof adopts ink print, which is hard to provide contour lines with homogeneous thickness and width, and the function of etching proof is poor at the contour line areas. Further, it is very easy to occur zigzag contour lines such that widths of the cutting lines have to be enlarged in order to avoid disconnected lines and, even more, thicker ink layer is used to cover the metal plate. As a result, operation of removing the ink at the final stage creates much polluted wastewater and the cutter body has to be grinded with a grinding machine, a CNC milling machine or a CNC lathe.

The light-resisting agent membrane used in the present invention has the advantages listed in the following:

(1) Homogeneousness: The light-resisting agent membrane 10 can adhere to the metal plate tightly so that it makes exposure and development of images possible.

(2) The cutting lines can be maintained at a minimum width respectively, which is very close to designed sharpness of the blade 26.

(3) The cutting lines have the same thickness throughout the entire length thereof and the cutting lines are covered with the light-resisting agent membrane 10 in good condition. Hence, the cutter body edge line is still smooth and neat after membrane 10 is removed with a physical way.

(4) The pollution nuisance decreases.

2. The second feature of the present invention is in that the etching liquid is pressurized and atomized before spraying on moving work pieces evenly in accordance with principle of etching liquid atomization and spray. The limited etching liquid, which is in a state of atomizing, creates a chemical reaction with the surface of the metal plate completely. In this way, the etching liquid can be used as less as possible and etching effect can be enhanced extremely. Further, the etching liquid can flow toward the collection barrel for reuse directly or after being separated or reduced so that it is recycled easily.

The conventional method for making an etched cutter mold is to immerse the metal plate in a container filled with etching liquid and it is hard to control etched parts at both lateral sides of the cutter body for not excessively hurting the force exerting point of the cutter body and more serious problem is consumption of the etching liquid and the pollution nuisance.

The etching liquid of the present invention is atomized and pressurized to spray downward to the etched surface from top and the covered surface of the light-resisting agent membrane 10 can be protected completely and the part under the covered surface is free from etching too. Hence, both sides of the cutter body form a top narrow and bottom wide wall naturally and the base can maintain at the same level after etching. It is worth to mention again that the atomized and pressurized etching liquid is less and can be recycled at any time to lower cost and decrease pollution nuisance.

3. The third feature of the present invention is the technique of precisely etching in the present invention is in that once the cutter mold blank is formed, the atomized pickle with lighter pressure sprays downward from top of the etched surface to further etch small spots at both sides of the top of the cutter body. The flowing downward solution deposits at the intersection of the cutter body and the base to form an auxiliary base 25 as shown in FIG. 2. It is different from working the blade with grinding machine, milling machine or lathe and provides faster effect and lower fabricating cost. Further, the distance between cutting lines can be reduced and the angular distance between the cutting lines can be reduced too. In addition, the blade 26 with reduced curve is provided.

While the invention has been described by way of examples and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for directly forming a cutter mold with double etching comprising the following steps:
   (1) selecting a metal plate suitable for being made as a cutter mold, the metal plate being adhered with a light-resisting agent membrane and the light resisting agent being image-transferred, exposed and developed to leave an optical mask membrane;
   (2) etching the optical mask membrane with approximately atomized etching liquid first after the etching liquid is regulated to provide a suitable spray pressure and inclination;
   (3) stripping the optical mask membrane rapidly by spraying water and discarded substances being separated from wastewater with a screen cylinder and both the discarded substances and the wastewater being collected with a recycle device respectively;
   (4) spraying the upper two lateral sides of the cutter mold with atomized etching liquid to remove sharp lines thereof; and
   (5) actuating a movable brush cylinder with magnetic force to move on the etching surface of the formed cutter in a rush with high speed so as to perform rubbing, grinding and finishing;
   whereby once the cutter mold is formed with the double etching, the blade can provide small circular arctice blade point.

2. The method for directly forming a cutter mold with double etching according to claim 1, further attaching a second membrane, which is incapable of being exposed and etched, to the back side of the metal plate.

3. The method for directly forming a cutter mold with double etching according to claim 1, further collecting the waste water and directing the waste back to wherein the waste water is collected to flow back to an etching liquid storage tank.

* * * * *